(12) United States Patent
Stratton

(10) Patent No.: US 7,634,431 B2
(45) Date of Patent: Dec. 15, 2009

(54) SYSTEMS AND METHODS FOR COSTING RECIPROCAL RELATIONSHIPS

(75) Inventor: Alan J. Stratton, Tigard, OR (US)

(73) Assignee: SAS Institute Inc., Cary, NC (US)

( * ) Notice: Subject to any disclaimer, the term of this patent is extended or adjusted under 35 U.S.C. 154(b) by 228 days.

(21) Appl. No.: 11/370,371

(22) Filed: Mar. 8, 2006

(65) Prior Publication Data

US 2007/0226090 A1    Sep. 27, 2007

(51) Int. Cl.
G07B 17/00 (2006.01)
G07F 7/10 (2006.01)
G06Q 10/00 (2006.01)

(52) U.S. Cl. ............... 705/30; 705/28; 705/33
(58) Field of Classification Search ............ 705/28, 705/30, 33
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist et al. | |
| 5,790,847 A * | 8/1998 | Fisk et al. | 707/4 |
| 5,799,286 A | 8/1998 | Morgan et al. | |
| 5,963,910 A | 10/1999 | Ulwick | |
| 5,970,476 A | 10/1999 | Fahey | |
| 6,009,407 A | 12/1999 | Garg | |
| 6,014,640 A * | 1/2000 | Bent | 705/30 |
| 6,029,139 A | 2/2000 | Cunningham et al. | |
| 6,078,892 A | 6/2000 | Anderson et al. | |
| 6,115,691 A | 9/2000 | Ulwick | |
| 6,236,977 B1 | 5/2001 | Verba et al. | |
| 6,237,138 B1 | 5/2001 | Hameluck et al. | |
| 6,275,812 B1 | 8/2001 | Haq et al. | |
| 6,286,005 B1 | 9/2001 | Cannon | |
| 6,321,206 B1 | 11/2001 | Honarvar | |
| 6,330,552 B1 * | 12/2001 | Farrar et al. | 705/400 |
| 6,490,569 B1 | 12/2002 | Grune et al. | |
| 6,502,077 B1 | 12/2002 | Speicher | |
| 6,526,526 B1 | 2/2003 | Dong et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,735,570 B1 | 5/2004 | Lacy et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,003,470 B1 * | 2/2006 | Baker et al. | 705/1 |

(Continued)

FOREIGN PATENT DOCUMENTS

WO    0111522    2/2001

(Continued)

OTHER PUBLICATIONS

Horngren, Charles T, et al., "Cost Accounting a Managerial Emphasis", Tenth Edition, Chapter 14, pp. 497-534, 2000.*

(Continued)

*Primary Examiner*—Matthew S Gart
*Assistant Examiner*—Ashford S Hayles
(74) *Attorney, Agent, or Firm*—Jones Day

(57) ABSTRACT

Computer-implemented systems and methods for performing cost analysis. As an example, a system and method can be provided for the generation of a cost allocation that does not include double counting of cost allocation.

31 Claims, 12 Drawing Sheets

U.S. PATENT DOCUMENTS

| | | | |
|---|---|---|---|
| 7,177,850 B2 * | 2/2007 | Argenton et al. | 705/400 |
| 7,308,414 B2 * | 12/2007 | Parker et al. | 705/7 |
| 7,376,647 B1 * | 5/2008 | Guyan et al. | 707/4 |
| 2001/0014868 A1 | 8/2001 | Herz et al. | |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0123945 A1 * | 9/2002 | Booth et al. | 705/30 |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0149613 A1 | 8/2003 | Cohen et al. | |
| 2003/0208402 A1 | 11/2003 | Bibelnieks et al. | |
| 2003/0208420 A1 | 11/2003 | Kansal | |
| 2003/0236721 A1 * | 12/2003 | Plumer et al. | 705/30 |
| 2004/0073496 A1 | 4/2004 | Cohen | |
| 2006/0143042 A1 * | 6/2006 | Gragg et al. | 705/2 |
| 2006/0253403 A1 * | 11/2006 | Stacklin et al. | 705/400 |
| 2007/0226090 A1 * | 9/2007 | Stratton | 705/30 |
| 2008/0065435 A1 * | 3/2008 | Ratzloff | 705/7 |

OTHER PUBLICATIONS

Data Mining News, Looking Past Automation, MarketSwitch Focuses on Optimization of Marketing Campaigns, Data Mining News, May 10, 1999 [Google].

Porter-Kuchay, Multidimensional Marketing, Target Marketing, Jan. 2000 [Dialog: file 13].

Spiegelman, Optimizers Assist in Specialized Marketing Efforts, Computer Reseller News, Nov. 22, 1999 [Proquest].

Balintfy et al., Binary and Chain Comparisons with an Experimental Linear Programming Food Price Index, The Review of Economics and Statistics, vol. 52, No. 3, Aug. 1970, pp. 324-330 [JSTOR].

Manchanda et al., The "Shopping Basket": A Model for Multi-category Purchase Incidence Decisions, Marketing Science, vol. 18, No. 2, 1999, pp. 95-114 [JSTOR].

Saarenvirta, "Data Mining to Improve Profitability", CMA Magazine, vol. 72, No. 2, Mar. 1998, pp. 8-12 [Dialog: file 15].

Johnson et al., "Recent Developments and Future Directions in Mathematical Programming", IBM Systems Journal, vol. 31, No. 1, 1992, pp. 79-93 [Dialog: file 15].

Modell by Group 1 Software, www.g1.com, Aug. 29, 1999 [retrieved Dec. 21, 2005], pp. 1-16, retrieved from: Google.com and archive.org.

SAS Institute Inc., Data Mining, www.sas.com, Jan. 29, 1998 [retrieved Dec. 22, 2005], pp. 1-28, retrieved from: Google.com and archive.org.

Hollander, Geoffrey, "Modell deftly parses customer characteristics", InfoWorld, May 25, 1998, vol. 20, No. 21, pp. 1-4, retrieved from: Dialog, file 148.

"Unica Releases Model 1 Enterprise Edition", Business Wire, Oct. 29, 1998 [retrieved Dec. 22, 2005, pp. 1-3, retrieved from: Proquest Direct.

Rosen, Michele, "There's Gold in That There Data", Insurance & Technology, Dec. 1998, vol. 23, No. 12, pp. 1-6, retrieved from: Dialog, file 16.

Chen et al., U.S. Appl. No. 11/211,353, filed Aug. 25, 2005 entitled "Financial Risk Mitigation Optimization Systems And Methods".

Kearney, Trevor D., "Advances in Mathematical Programming and Optimization in the SAS System," SUGI Proceedings, 1999 (12 pp.).

Cohen, Marc-david, et al., "SAS/OR® Optimization Procedures, with Applications to the Oil Industry," SUGI Proceedings, 1994 (pp. 1-9).

Beaman, Benita M., "Supply chain design and analysis: Models and methods", International Journal of Production Economics, Apr. 15, 1998, pp. 281-294.

Lee, Eon-Kyung, et al., "An effective supplier development methodology for enhancing supply chain performance," ICMIT 2000, pp. 815-820.

"Perfect and Open Ratings Form Alliance to Provide Critical Supplier Performance Ratings to Private Exchanges and Net Markets", Business Wire, Oct. 30, 2000 (3 pp.).

"12 Technologies: i2 releases i2 Five.Two—The complete platform for dynamic value chain management; Flexible, intuitive, powerful solutions designed to help companies gain efficiencies and drive revenue", M2 Presswire, Oct. 25, 2001 (4 pp.).

Medaglia, Andres L., "Simulation Optimization Using Soft Computing", dissertation for Operations Research Department at North Carolina State University, Jan. 24, 2001 (2 pp.).

Lee, Eon-Kyung, et al., "Supplier Selection and Management System Considering Relationships in Supply Chain Management", IEEE Transactions on Engineering Management, vol. 48, No. 3, Aug. 2001, pp. 307-318.

Samudhram, Ananda, "Solver setting for optimal solutions", New Strait Times, Nov. 22, 1999 (3 pp.).

Cook, Wade D., et al., "Evaluating Suppliers of Complex Systems: A Multiple Criteria Approach", The Journal of the Operational Research Society, vol. 43, No. 11, Nov. 1992 ( pp. 1055-1061.

Cokins, Gary et al., "An ABC Manager's Primer Straight Talk on Activity-Based Costing", Institute of Management Accountants, Mar. 9, 1993, pp. 1-40, 63-64.

Horngren, Charles T. et al., "Cost Accounting a Managerial Emphasis", Tenth Edition, Chapter 14, pp. 497-534, 2000.

* cited by examiner

| ENTITY | LEVEL 1 | | LEVEL 2 | | LEVEL 3 | |
|---|---|---|---|---|---|---|
| | RELATIONSHIP | DISPOSITION | RELATIONSHIP | DISPOSITION | RELATIONSHIP | DISPOSITION |
| HR | HR-HR | ALREADY INCLUDED | | | | |
| | HR-IT | RECIPROCATE TO NEXT LEVEL | HR-IT-HR | ALREADY INCLUDED | | |
| | | | HR-IT-IT | ALREADY INCLUDED | | |
| | | | HR-IT-MT | RECIPROCATE TO NEXT LEVEL | HR-IT-MT-HR | ALREADY INCL |
| | | | | | HR-IT-MT-IT | ALREADY INCL |
| | | | | | HR-IT-MT-MT | ALREADY INCL |
| | | | | | HR-IT-MT-AS | ACCUMULATE |
| | | | | | HR-IT-MT-TS | ACCUMULATE |
| | | | HR-IT-AS | ACCUMULATE | | |
| | | | HR-IT-TS | ACCUMULATE | | |
| | HR-MT | RECIPROCATE TO NEXT LEVEL | HR-MT-HR | ALREADY INCLUDED | | |
| | | | HR-MT-IT | RECIPROCATE TO NEXT LEVEL | HR-MT-IT-HR | ALREADY INCL |
| | | | | | HR-MT-IT-IT | ALREADY INCL |
| | | | | | HR-MT-IT-MT | ALREADY INCL |
| | | | | | HR-MT-IT-AS | ACCUMULATE |
| | | | | | HR-MT-IT-TS | ACCUMULATE |
| | | | HR-MT-MT | ALREADY INCLUDED | | |
| | | | HR-MT-AS | ACCUMULATE | | |
| | | | HR-MT-TS | ACCUMULATE | | |
| | HR-AS | ACCUMULATE | | | | |
| | HR-TS | ACCUMULATE | | | | |

Fig. 11

| ENTITY | LEVEL 1 | | LEVEL 2 | | LEVEL 3 | |
|---|---|---|---|---|---|---|
| | RELATIONSHIP | DISPOSITION | RELATIONSHIP | DISPOSITION | RELATIONSHIP | DISPOSITION |
| IT | IT-HR | RECIPROCATING TO NEXT LEVEL | IT-HR-HR | ALREADY INCLUDED | | |
| | | | IT-HR-IT | ALREADY INCLUDED | | |
| | | | IT-HR-MT | RECIPROCATING TO NEXT LEVEL | IT-HR-MT-HT | ALREADY INCLUDED |
| | | | | | IT-HR-MT-IT | ALREADY INCLUDED |
| | | | | | IT-HR-MT-MT | ALREADY INCLUDED |
| | | | | | IT-HR-MT-AS | COMPLETE-ACCUMULATE |
| | | | | | IT-HR-MT-TS | COMPLETE-ACCUMULATE |
| | | | IT-HR-AS | COMPLETE-ACCUMULATE | | |
| | | | IT-HR-TS | COMPLETE-ACCUMULATE | | |
| | IT-IT | ALREADY INCLUDED | | | | |
| | IT-MT | RECIPROCATING TO NEXT LEVEL | IT-MT-HR | RECIPROCATING TO NEXT LEVEL | IT-MT-HR-HR | ALREADY INCLUDED |
| | | | | | IT-MT-HR-IT | ALREADY INCLUDED |
| | | | | | IT-MT-HR-MT | ALREADY INCLUDED |
| | | | | | IT-MT-HR-AS | COMPLETE-ACCUMULATE |
| | | | | | IT-MT-HR-TS | COMPLETE-ACCUMULATE |
| | | | IT-MT-IT | ALREADY INCLUDED | | |
| | | | IT-MT-MT | ALREADY INCLUDED | | |
| | | | IT-MT-AS | COMPLETE-ACCUMULATE | | |
| | | | IT-MT-TS | COMPLETE-ACCUMULATE | | |
| | IT-AS | COMPLETE-ACCUMULATE | | | | |
| | IT-TS | COMPLETE-ACCUMULATE | | | | |

Fig. 12

| ENTITY | LEVEL 1 | | LEVEL 2 | | LEVEL 3 | |
|---|---|---|---|---|---|---|
| | RELATIONSHIP | DISPOSITION | RELATIONSHIP | DISPOSITION | RELATIONSHIP | DISPOSITION |
| MT | MT-HR | RECIPROCATE TO NEXT LEVEL | MT-HR-HR | ALREADY INCLUDED | | |
| | | | MT-HR-MT | RECIPROCATE TO NEXT LEVEL | MT-HR-IT-HR | ALREADY INCL |
| | | | | | MT-HR-IT-IT | ALREADY INCL |
| | | | | | MT-HR-IT-MT | ALREADY INCL |
| | | | | | MT-HR-IT-AS | ACCUMULATE |
| | | | | | MT-HR-IT-TS | ACCUMULATE |
| | | | MT-HR-MT | ALREADY INCLUDED | | |
| | | | MT-HR-AS | ACCUMULATE | | |
| | | | MT-HR-TS | ACCUMULATE | | |
| | MT-IT | RECIPROCATE TO NEXT LEVEL | MT-IT-HR | RECIPROCATE TO NEXT LEVEL | HR-MT-IT-HR | ALREADY INCL |
| | | | | | HR-MT-IT-IT | ALREADY INCL |
| | | | | | HR-MT-IT-MT | ALREADY INCL |
| | | | | | HR-MT-IT-AS | ACCUMULATE |
| | | | | | HR-MT-IT-TS | ACCUMULATE |
| | | | MT-IT-IT | ALREADY INCLUDED | | |
| | | | MT-IT-MT | ALREADY INCLUDED | | |
| | | | MT-IT-AS | ACCUMULATE | | |
| | | | MT-IT-TS | ACCUMULATE | | |
| | MT-MT | ALREADY INCLUDED | | | | |
| | MT-AS | ACCUMULATE | | | | |
| | MT-TS | ACCUMULATE | | | | |

Fig. 13

SYSTEMS AND METHODS FOR COSTING RECIPROCAL RELATIONSHIPS

BACKGROUND

The present disclosure is generally directed to computer-implemented cost analysis, and more specifically to computer-implemented cost analysis of reciprocal business relationships.

Businesses are motivated by the market to remain competitive with respect to their competitors. One of the ways to remain competitive, for example, is to reduce costs. Such reductions in costs should accurately reflect the circumstances of the business, rather than being merely an artificial cost number which has no basis in fact. Thus, businesses should properly account for various cost pools, including, for example, costs, profits, budgets, capital, etc.

Accurate accounting for various cost pools can become complex where the business includes entities that have reciprocal relationships with each other. Traditional methods for determining the cost of reciprocal relationships include a step down method, and a simultaneous equations method. The step down method attempts to ignore reciprocal relationships in order to simplify the solution, thereby producing a solution that varies based upon the order in which the system is solved. More specifically, the "step-down" technique selectively eliminates reciprocal relationships. For example, the step-down technique ignores the cost to an entity to support itself and instead assigns the cost of a first entity to all other entities. A second entity then takes the cost (including cost from the first entity and direct cost) and assigns these costs to all other entities except for the first entity. Similarly, a third reciprocal entity takes the cost and assigns the cost to all other entities except for the first and second entities. However, this technique yields a different result depending upon the order in which the entities are analyzed. Moreover, the technique does not represent the reality of the business situation, because where the first entity and second entity support each other, the step-down method effectively ignores the reciprocal nature of the relationship by omitting the entities from the analysis after the entity has been analyzed.

Another accounting technique includes the use of simultaneous equations to solve for each of the entities. The simultaneous equations solution includes a mathematical solution that accounts for reciprocal relationships, but can produce a misleading result that can be many times the direct cost of the department. In this method, equations are developed to describe the relationships among each of a plurality of entities. These equations are then solved simultaneously. The simultaneous equations method is essentially an iterative method whereby a cost is passed back-and-forth between entities an infinite number of times to obtain the solution. The result of the calculation can appear abnormally large. For example, where many reciprocal relationships exist and/or the magnitude of the mutual reciprocity is large, the cost can be many times the direct cost of an entity because the cost is passed back and forth an infinite number of times.

SUMMARY

In accordance with the teachings provided herein, systems and methods for operation upon data processing devices are provided in order to overcome one or more of the aforementioned disadvantages or other disadvantages concerning costing analysis.

As an example, a system and method can be configured to account for reciprocal relationships without double counting. Direct costs are allocated among entities (wherein at least one of the entities has a reciprocal relationship with another of the entities). Indirect costs are reallocated among the entities without allocating the costs to an entity that had previously allocated or reallocated the cost. This is performed until the costs are reallocated to an entity that does not have any reciprocal relationships with any of the other entities, thereby producing an allocation of costs.

BRIEF DESCRIPTION OF THE DRAWINGS

FIGS. 11-13 are tables which graphically depict an operational scenario of reciprocal costing methods and systems.

DETAILED DESCRIPTION

Figure 1:
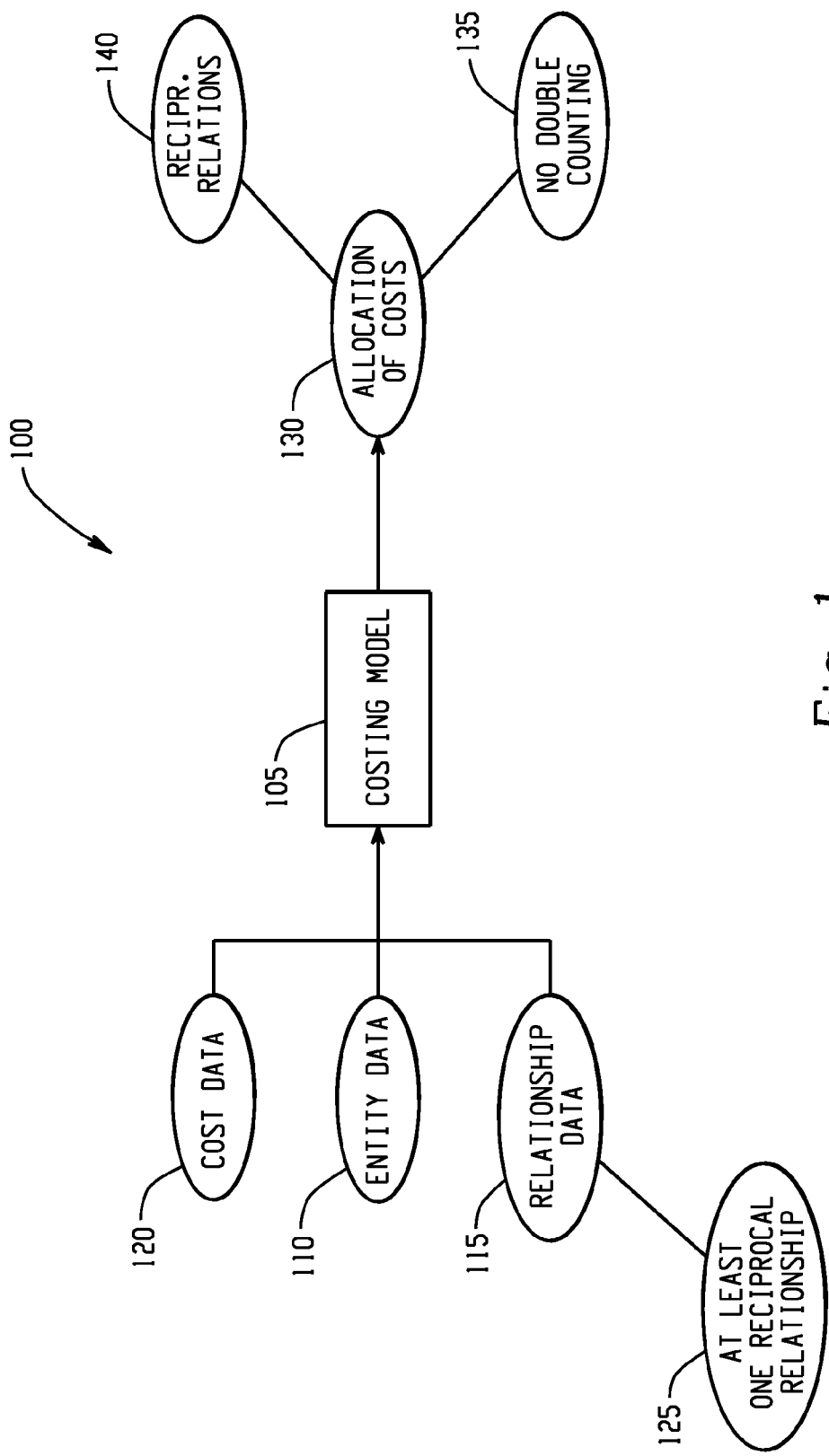
FIG. 1 is a block diagram depicting an example of a reciprocal costing system.

FIG. 1 depicts a computer-implemented reciprocal costing system 100. A reciprocal costing system 100 can include a costing model 105 that allocates costs (e.g., expenses, profits, budgets, capital, assets, property, etc.) to various entities (e.g., cost pools) that comprise a concern (e.g., a business). The costing model 105 can accomplish this based upon such inputs as entity data 110, relationship data 115, and cost data 120.

The entity data 110 can represent any number of entities, including, but not limited to, cost pools such as activity-based cost pools, process-based cost pools, and other logical groupings of money.

The cost data 120 can represent the money allocated (or to be allocated) to a particular cost pool. It should be understood that the term cost is used broadly to cover a range of possible uses of money and/or other property. For example, cost data 120 can in some instances refer to budgeting where an actual expense does not yet exist.

The relationship data 115 includes information regarding the relationships between entities, such as information about one or more reciprocal relationships 125 between entities. Reciprocal relationships occur where two entities have obligations to each other. For example, a business may be composed of several departments, including, but not limited to, human resources, information technology, maintenance, test, and assembly. The human resources department provides services to each of the other departments. Similarly, the information technology and maintenance departments provide services to each of the other departments. The human resources, information technology, and maintenance departments all have reciprocal relationships and expenses are assigned both ways between each of these entities. In this example, the amount of service provided to a department determines how much expense is allocated from the servicing department to the receiving department. It should also be understood that some reciprocal relationships are indirect. For example, entity A may assign costs to entity B, which assigns costs to entity C, which assigns costs to entity A.

The entity data 110, the relationship data 115, and the cost data 120 can be used in constructing a model of a costing system. With the constructed costing model 105 of FIG. 1, an allocation of costs 130 can be determined for the entities' relationships, including any reciprocal relationships 140. This allocation uses the entity data 110, the relationship data 115 and the cost data 120 to allocate direct (and indirect if present) costs among a plurality of entities which includes at least a pair of entities that have a reciprocal relationship with each other. The allocation of costs 130 includes costs that are not double counted (as indicated at 135).

Figure 2:
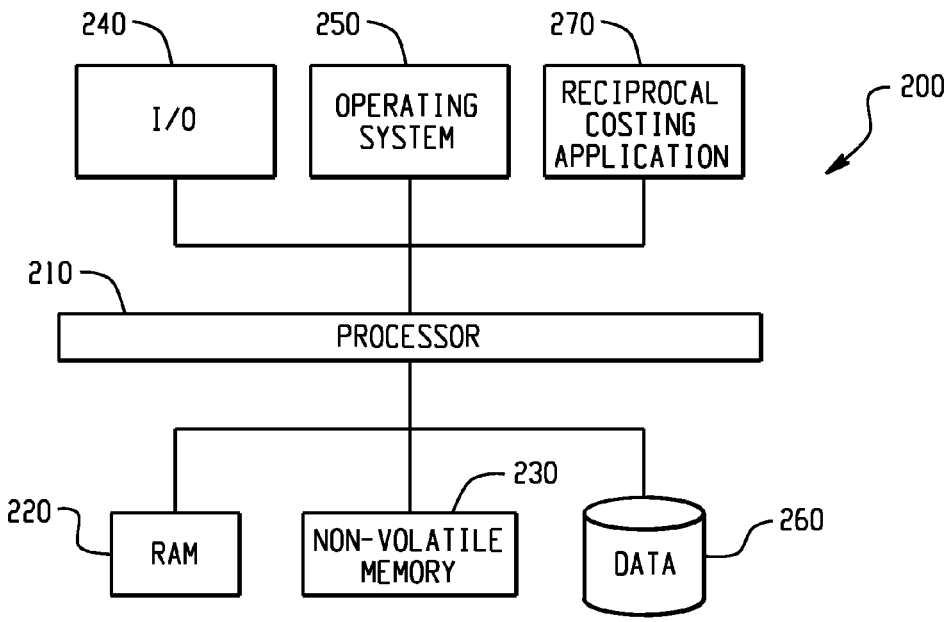
FIG. 2 is a block diagram of a computer system having access to data for use in reciprocal costing.

FIG. 2 depicts a block diagram of a computing device 200 that can execute a reciprocal costing method associated with this disclosure. The computing device 200 includes a processor 210 which is configured to execute instructions stored in memory, such as a random access memory (RAM) 220. The instructions can be transferred to the RAM 220 from the non-volatile memory 230 in preparation for execution. It should be understood that the non-volatile memory 230 can further contain other non-instruction data. The processor can communicate with a user, or other program via any supported input/output interfaces 240. Examples of such I/O interfaces can include a monitor, a keyboard, a mouse, and a communication interface to communicate with other computers, among many others. An operating system (O/S) 250 executing on the processor can help to facilitate operation of the computer and execution of any applications residing on the computer system 200. It should be recognized that each of these components of the computing system are readily available in myriad different combinations, and this disclosure is intended to apply equally to all past, present and future computing systems.

The computing system 200 further includes a connection to entity, relationship and cost data stored in a data store 260. A myriad of suitable data stores are commercially available from a variety of vendors. It should be noted that the data store 260 can be co-located with the computing system 200 or remotely located from the computing system 200. The data store can include information about the entities, relationships and costs associated with the entities, such that a costing model can be created from the data. Alternatively, a costing model could be input into the system by a user, and stored in the data store 260.

The computing system 200 also includes a reciprocal costing application 270. The reciprocal costing application 270 assembles a costing model from entity, relationship and costing data, and produces an allocation of costs to each of the entities that can include both direct costs and indirect costs. Moreover, the allocation of costs does not double count the allocations among the entities. For example, the reciprocal costing application 200 does not assign costs to an entity that previously assigned the costs to that entity. Further, the reciprocal costing application 270 accounts for the reciprocal nature of reciprocal relationships, and produces an allocation of costs that does not change based upon the order in which the entities are analyzed.

Figure 3:
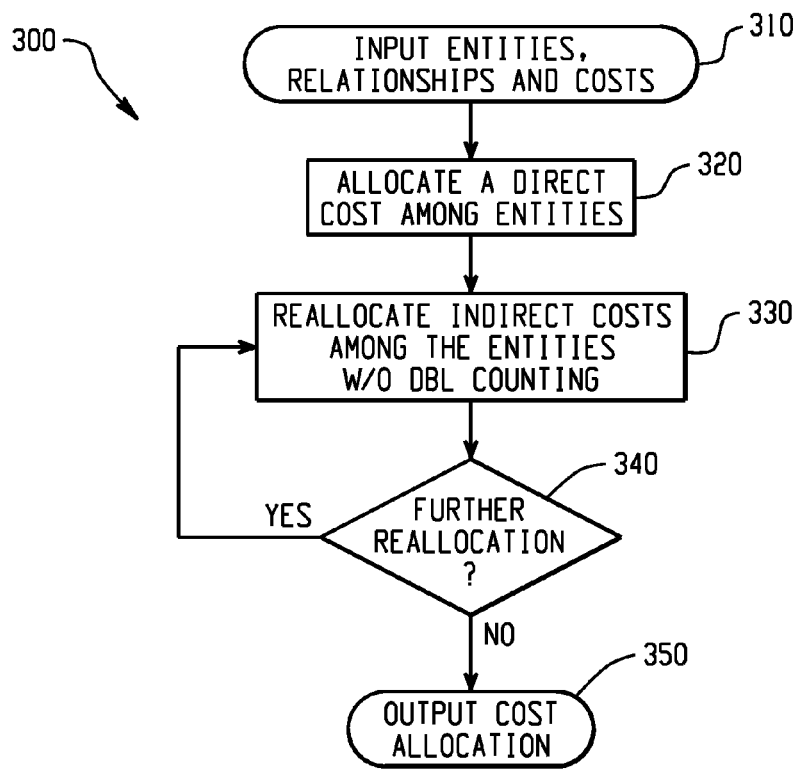
FIGS. 3-5 are flowcharts depicting example operational scenarios of reciprocal costing.

FIG. 3 is a flowchart depicting an operational scenario 300 for reciprocal costing. The operational scenario begins by receiving entity, relationship and cost data at step 310. The operational scenario allocates a direct cost among the entities at step 326. Indirect costs are then reallocated among the entities, while avoiding allocating costs back to an entity that previously allocated the costs, as shown by step 330. For example, where a human resources entity assigned a cost to a finance entity, that cost will be part of the cost that is reallocated by the finance department to every other entity that it supports, except for the human resources entity. In this example, the reciprocal relationship is accounted for when the finance entity assigns its direct costs to all of the entities, including the human resources entity. The human resources entity then reallocates the indirect cost received from the finance entity to every entity except for the finance entity. As shown by step 340, this occurs for every reciprocal entity until the cost is assigned to an entity that does not have an end user (e.g., an entity that cannot reassign the costs through a reciprocal relationship). The operational scenario then outputs a cost allocation, as shown by step 350, that does not include double counting, while accounting for the reciprocal nature of the relationships.

Figure 4:
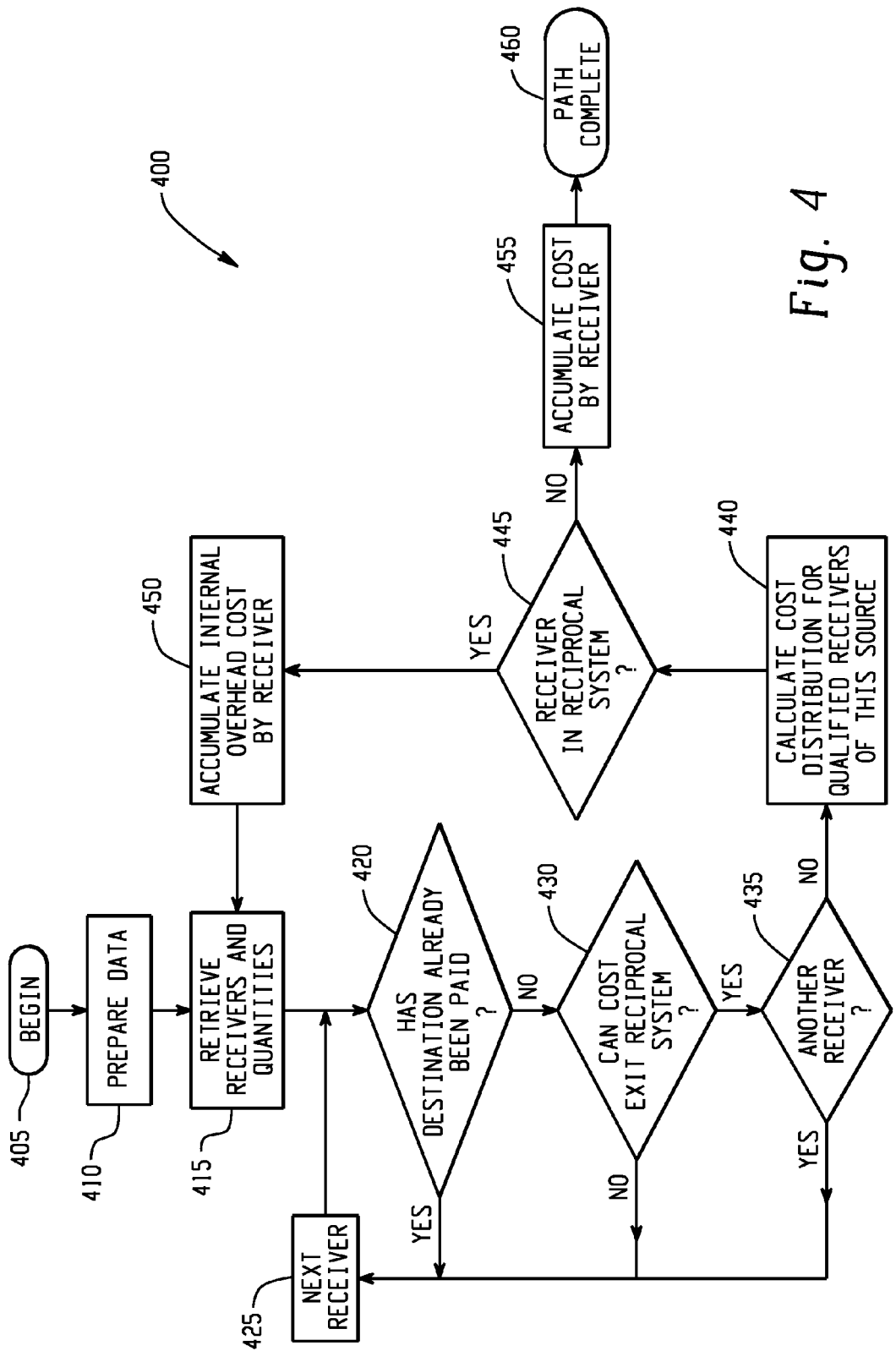

FIG. 4 is a flowchart depicting another operational scenario 400 for reciprocal costing. The operational scenario begins at step 405. The data (e.g., entity, relationship and cost data) is prepared at step 410. The operational scenario then retrieves the receivers and the quantities (e.g., costs) as shown in step 415. The operational scenario then determines whether a current destination receiver has already been paid at step 420. If the destination receiver has been paid, the operational scenario moves to the next receiver as shown in step 425, and returns to step 420 to determine whether the new receiver has been paid.

If the destination receiver has not been paid, the operational scenario determines at step 430 whether the cost can exit the reciprocal system (e.g., whether the destination receiver can reallocate the cost). If the cost cannot exit the system, the operational scenario moves on to the next receiver at step 425, and returns to step 420. However, if the cost can exit the system, the operational scenario determines whether another receiver exists at step 435. Where another receiver exists, the operational scenario moves to the next receiver as shown by step 425, and returns to step 420 to perform the allocation on the new receiver.

Where there are no further receivers, the operational scenario calculates a cost distribution for qualified receivers of a source at step 440. The operational scenario then determines whether a receiver is in a reciprocal system at step 445. Where the receiver is in a reciprocal system, the operational scenario accumulates the internal overhead cost by the receiver at step 450, and then retrieves a next level of receivers and quantities for the current receiver at step 415. Returning to step 445, if the receiver is not in the reciprocal system the operational scenario accumulates cost by the receiver at step 455. As shown by step 460, the path is complete.

Figure 5:
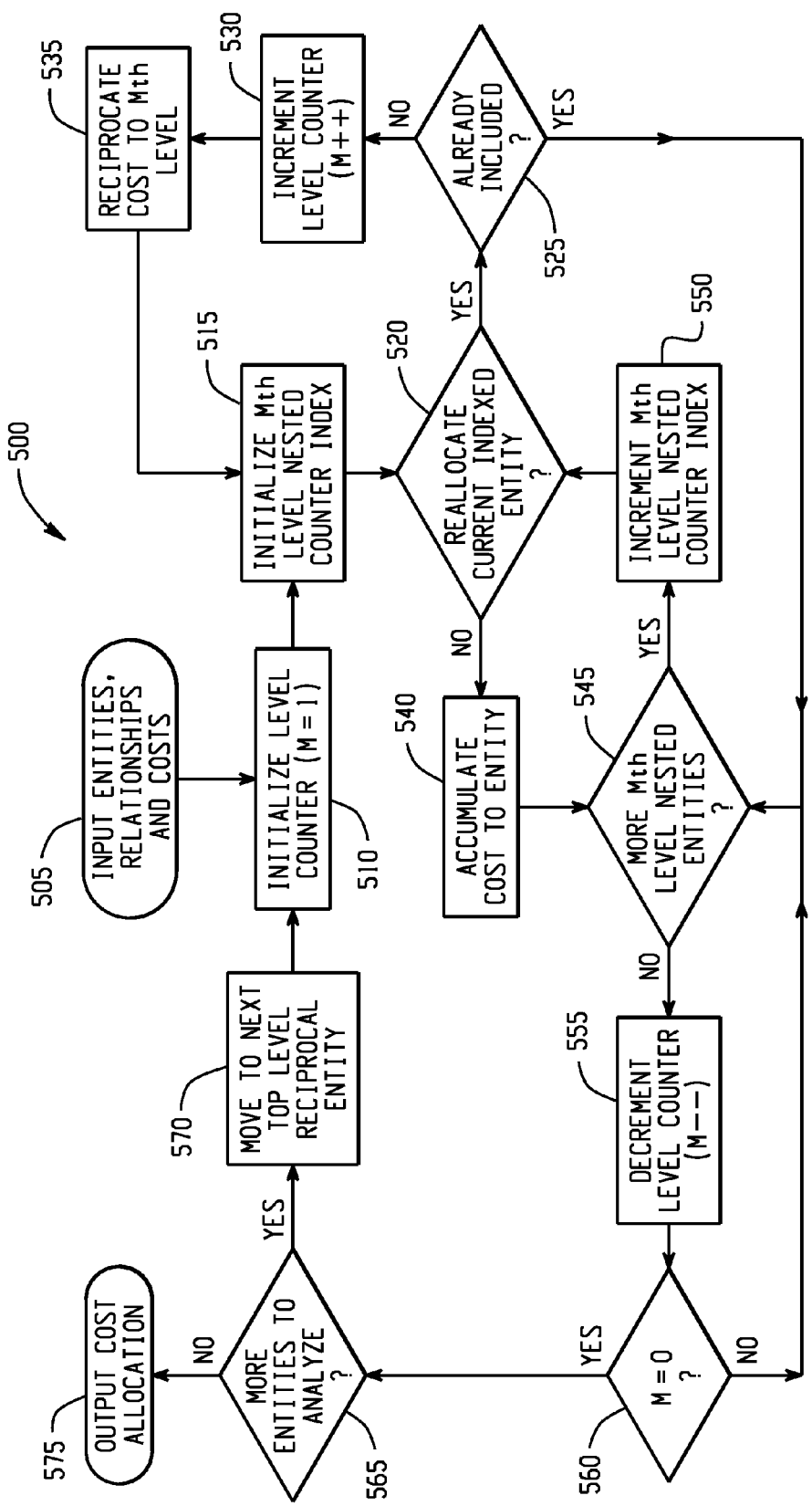

Shown in FIG. 5 is a flowchart depicting another operational scenario 500 for reciprocal costing. In step 505, the entities, relationship and costs are input into the operational scenario. The operational scenario initializes the level counter (M) in step 510, and initializes an Mth level nested counter in step 515. At step 520 and after all of the entities have been processed in order to know the total of which costs are to be accumulated, the operational scenario determines whether the entity associated with the current nested counter index can reallocate the cost. Where the current nested counter index can reallocate the cost, the operational scenario determines whether the cost for that entity has already been included 525 (e.g., if it was previously assigned to/from the current entity). If the entity is not already included, the operational scenario increments the level counter at step 530 and reciprocates the cost to the next level at step 535. The operational scenario then initializes an Mth level counter at step 515. It should be understood that the counter initialized earlier is not affected by this new initialization, because the initialization is a new counter associated with Mth level nesting.

Returning to step 520, if the current nested counter index cannot reallocate the cost, then the cost is accumulated to the entity, as shown in step 540. At step 545, the operational scenario determines whether there are more Mth level nested entities. If there are more Mth level nested entities, the operational scenario increments the nested counter index to move to the next nested entity, as shown in step 550. The operational scenario then returns to step 520 to determine whether the current nested counter index can reallocate the cost.

Returning to step 525, if the cost has already been assigned to an entity associated with the current nested counter index, then the operational scenario moves to step 545 to determine whether there are more nested entities that exist at the Mth level. If there are more nested entities at the Mth level, the operational scenario increments the nested counter index at step 550 and determines whether an entity associated with the incremented nested counter index can reallocate the cost at step 520.

If there are no more Mth level entities at step 545, the operational scenario decrements the level counter at step 555. The operational scenario then determines whether the level counter is at zero at step 560. Where the level counter is not equal to zero (e.g., indicating that there are more entities left to analyze), the operational scenario returns to step 545 and continues operation as described above, such that each combination of possible relationship chains is analyzed. At step 565, the operation scenario determines whether there are more top level reciprocal entities to analyze. If there are more top level reciprocal entities to analyze, the operational scenario moves to the next top level reciprocal entity, as shown in step 570. When there are no more top level reciprocal entities to analyze, the operational scenario terminates by outputting the cost allocation at step 575.

Figure 6:
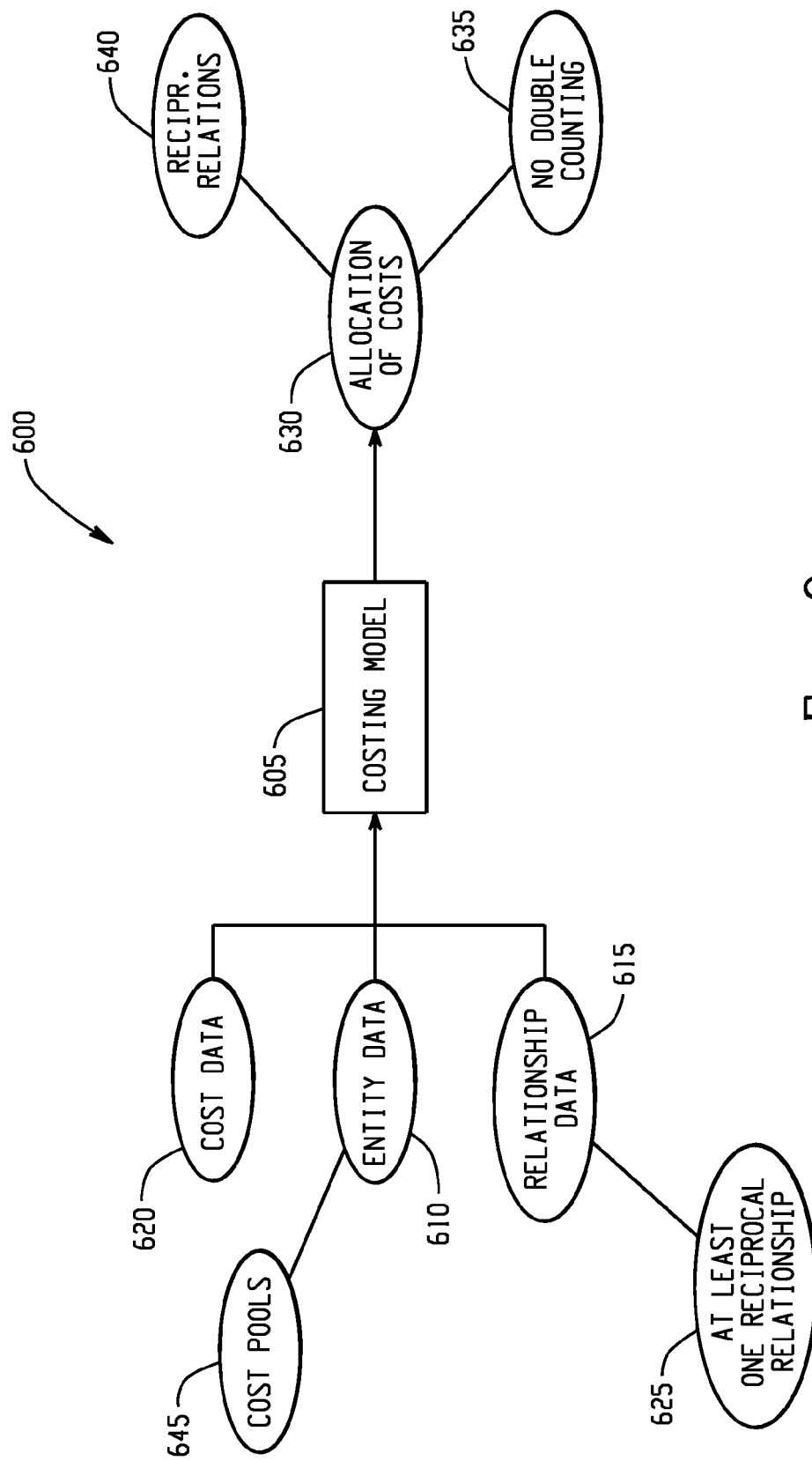
FIGS. 6-9 are block diagrams depicting examples of reciprocal costing systems.

FIG. 6 shows a system at 600 for reciprocal costing without double counting. A costing model 605 receives entity data 610, relationship data 615 and cost data 620. The entity data 610 can be described as cost pools 645 in some reciprocal costing systems and methods. The relationship data 615 can include at least one reciprocal relationship 625 among a subset of entities. The costing model 605 then produces a cost allocation 630 among the entities. The cost allocation 630 can exclude double counting 635 by avoiding reallocating costs to an entity that previously assigned the costs. Further, the cost allocation 630 accounts for the reciprocal relationships 640 among the entities, such that the cost allocation contains symmetry between the top level entities.

Figure 7:
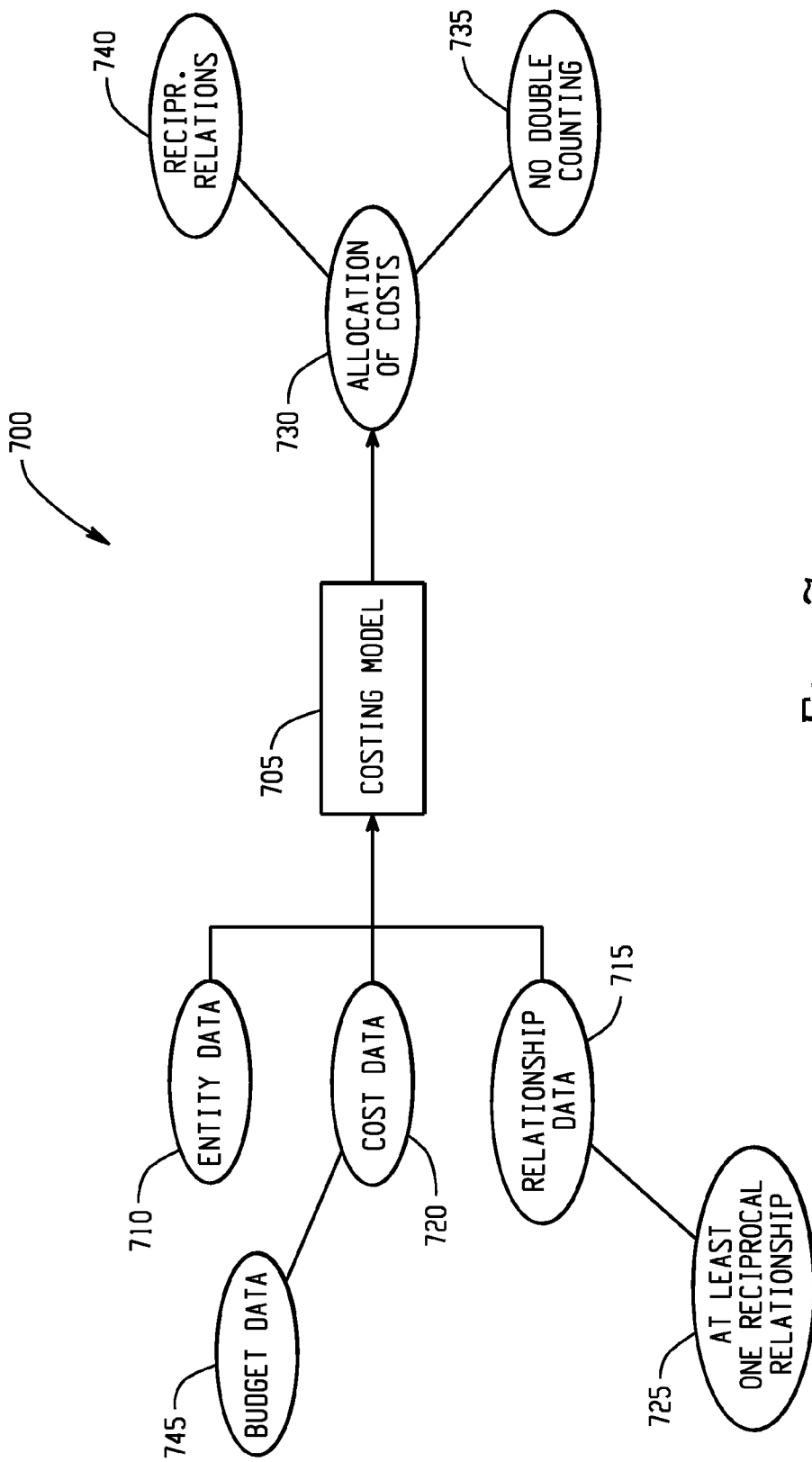

FIG. 7 shows at 700 a block diagram depicting systems and methods for reciprocal costing without double counting. A costing model 705 receives entity data 710, relationship data 715 and cost data 720. The cost data 720 can be described as budget data 745 in some reciprocal costing systems and methods. The relationship data 715 can include at least one reciprocal relationship 725 among a subset of entities. The costing model 705 then produces a cost allocation 730 among the entities. The cost allocation 730 can exclude double counting 735 by avoiding reallocating costs to an entity that previously assigned the costs. Further, the cost allocation 730 accounts for the reciprocal relationships 740 among the entities, such that the cost allocation contains symmetry between the top level entities.

Figure 8:
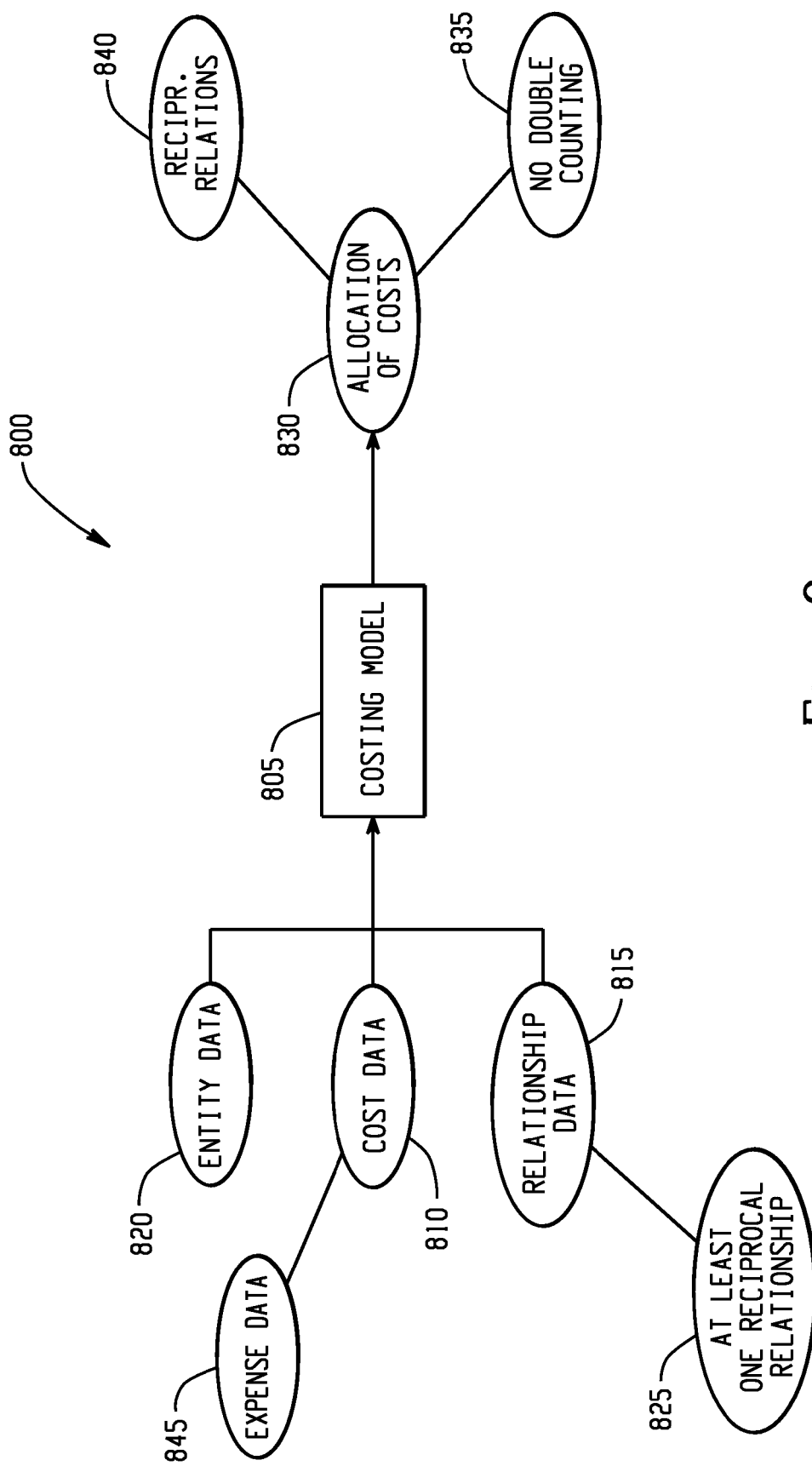

FIG. 8 shows at 800 a block diagram depicting systems and methods for reciprocal costing without double counting. A costing model 805 receives entity data 820, relationship data 815 and cost data 810. The cost data 810 can be described as expense data 845 in some reciprocal costing systems and methods. The relationship data 815 can include at least one reciprocal relationship 825 among a subset of entities. The costing model 805 then produces a cost allocation 830 among the entities. The cost allocation 830 can exclude double counting 835 by avoiding reallocating costs to an entity that previously assigned the costs. Further, the cost allocation 830 accounts for the reciprocal relationships 840 among the entities, such that the cost allocation contains symmetry between the top level entities.

Figure 9:
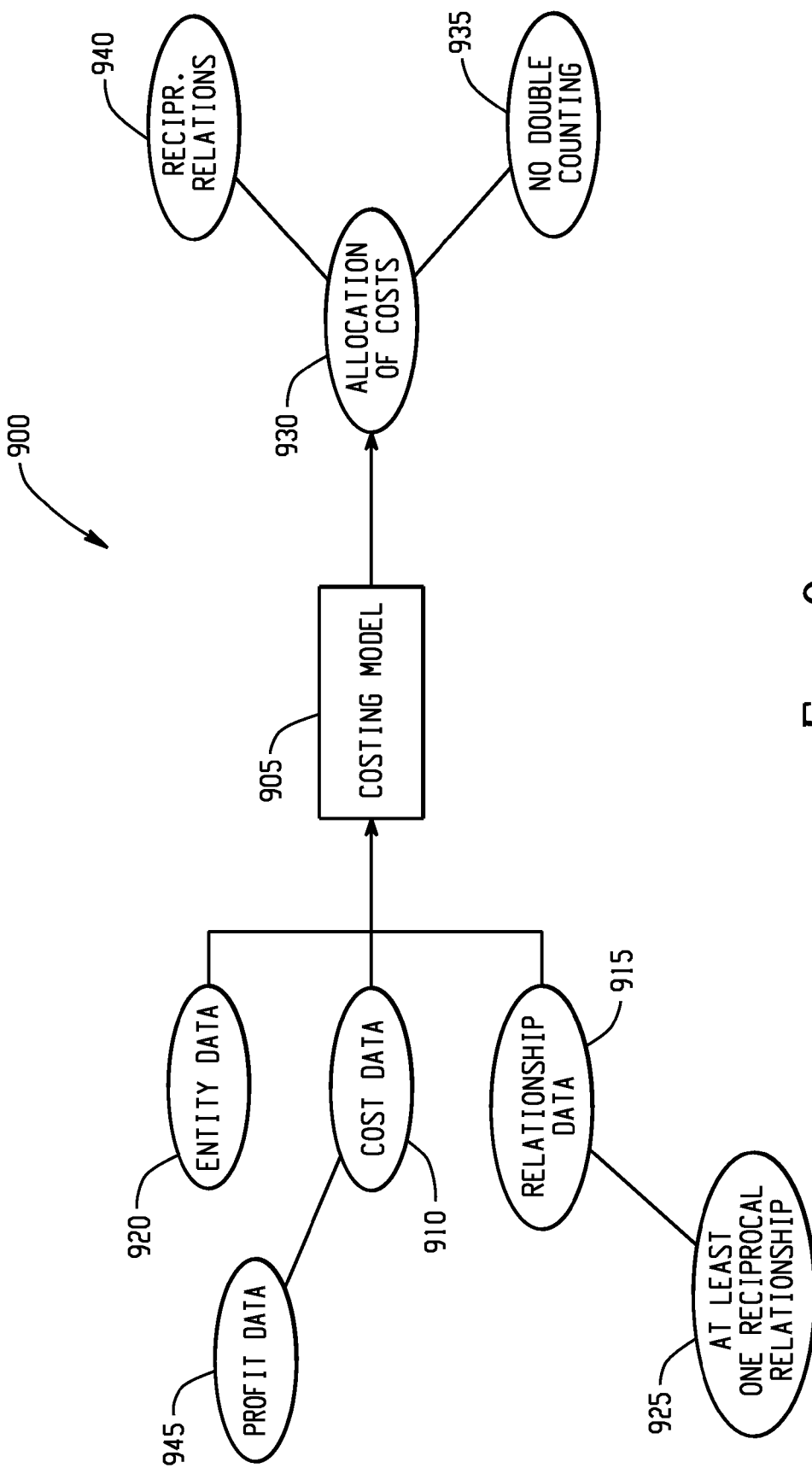

FIG. 9 shows at 900 a block diagram depicting systems and methods for reciprocal costing without double counting. A costing model 905 receives entity data 920, relationship data 915 and cost data 910. The cost data 910 can be described as profit data 945 in some reciprocal costing systems and methods. The relationship data 915 can include at least one reciprocal relationship 925 among a subset of entities. The costing model 905 then produces a cost allocation 930 among the entities. The cost allocation 930 can exclude double counting 935 by avoiding reallocating costs to an entity that previously assigned the costs. Further, the cost allocation 930 accounts for the reciprocal relationships 940 among the entities, such that the cost allocation contains symmetry between the top level entities.

Figure 10:
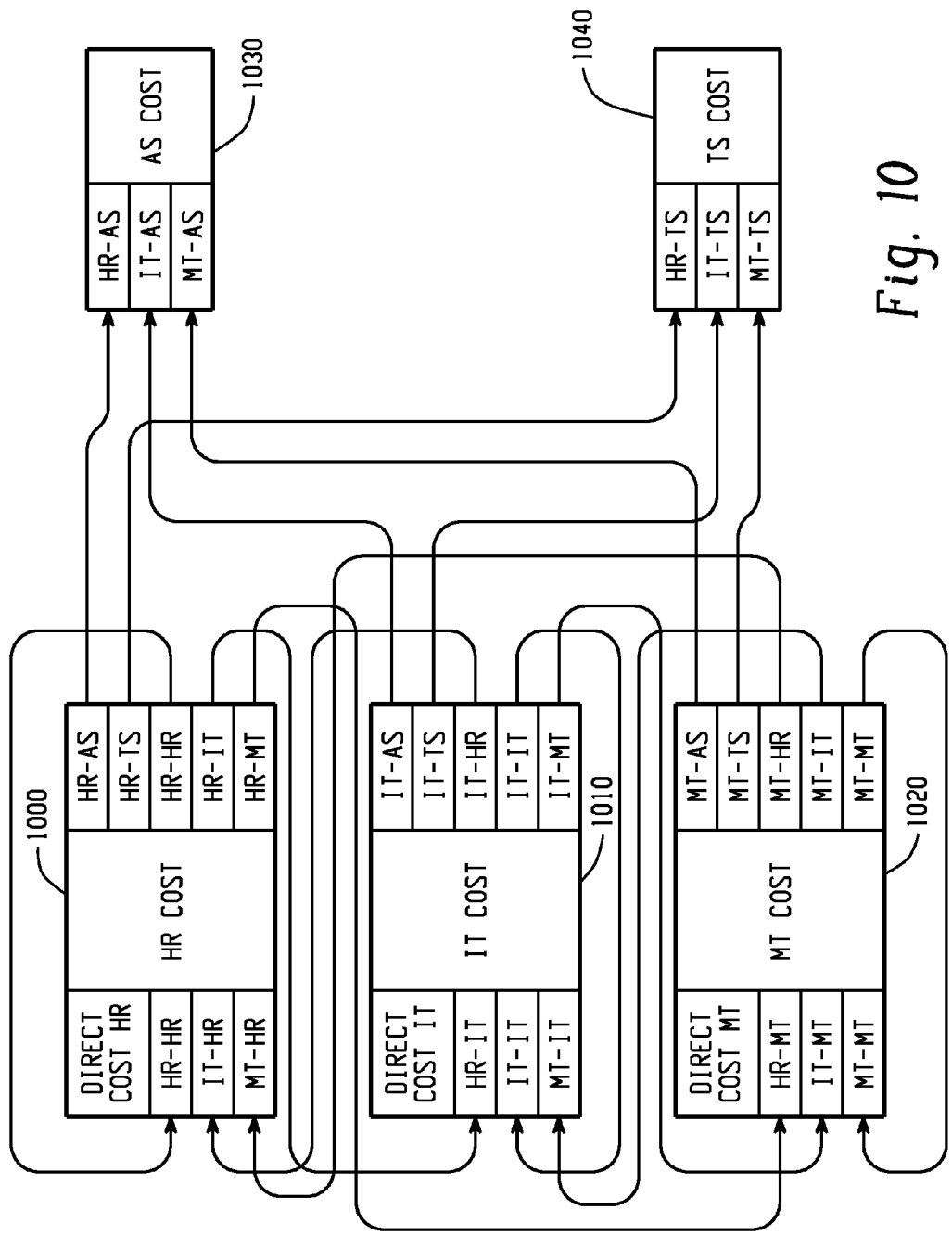
FIG. 10 is a flow diagram which depicts cost flow relationships among example entities.

FIG. 10 is a block diagram graphically depicting an example of interrelationships between entities (e.g., departments) within a business upon which reciprocal costing systems and methods can operate. For example, a business can include a human resources (HR) department 1000, an information technology (IT) department 1010, a maintenance (MT) department 1020, an assembly (AS) department 1030, and a test (TS) department 1040. The departments can each include a direct cost received from the business. Moreover, support departments like HR 1000, IT 1010 and MT 1020 all have some cost associated with supporting themselves. For example, HR 1000 hires staff to handle the duties assigned to the HR department, and the IT department 1010 buys computers for their workers, etc. Moreover, in this example, each of these departments support each other. Thus, HR 1000 and MT 1020 have computers from the IT department 1010, HR 1000 hires staff for MT 1020 and IT 1010, MT 1020 maintains the work areas for HR 1000 and IT 1010. Furthermore, in this example, each of these support departments 1000, 1010, 1020 provide service to non-reciprocal departments, such as AS 1030 and TS 1040. FIG. 10 graphically illustrates the relationships between departments using arrows. The smaller boxes (not labeled) on the left side of the departments illustrate costs that are assigned to the entity from another entity. The smaller boxes (not labeled) on the right side of the departments illustrate costs that are assign by the entity to another entity.

It should be understood that an organizational structure, for example, can become increasingly complex as the organization grows. Moreover, it should be noted that the entities can be designed to be more detail specific. For example, HR could be split into several subcategories including, hiring, administrative, investigative, etc., while IT could be split into hardware troubleshooting, software troubleshooting, installation, maintenance, database administration, etc. Moreover, this disclosure could be used to allocate costs among a department by splitting the department into activity based entities, or any other model that can provide discrimination between the various entities to be analyzed.

FIGS. 11-13 illustrate an example of one of the reciprocal costing systems and methods of this disclosure. Although the example shows three levels, it should be noted that the example could have had 2, 3, 4, 5 . . . N levels.

With reference to FIG. 11, the HR department is the first department analyzed. At the first level (as indicated by the column header), HR has a reciprocal relationship with itself, which is already included in the analysis based upon the direct costs of HR. Remaining at the first level, HR can also assign costs to an IT department, a MT department, an AS department and a TS department. The IT and MT departments are reciprocal entities, and therefore can reallocate the costs assigned to them from the HR department. As such, the cost is reciprocated to level 2 (as indicated by the column header). However, the AS and TS departments are not reciprocal entities. Therefore, the costs assigned to these entities from HR is accumulated because it is assigned to an end user.

At level 2, the IT department can try to reallocate the costs received from the HR department by inspecting all of the different departments to which it could reallocate costs. However, HR has already allocated these costs. Moreover, IT cannot allocate the costs to itself, because these costs have already been included in the analysis. The IT department can reallocate the costs to the MT departments because the MT department has not previously received costs via the HR-IT link. The costs assigned to MT are therefore reciprocated to level 3 (as indicated by the column header). IT can assign the costs to AS and TS. These costs are then accumulated because these costs cannot be reallocated from AS and TS.

At level 3, MT attempts to allocate costs to each of the other entities. However, these costs cannot be reallocated to any of the other support departments. As such, these costs are reallocated to the AS and TS departments and accumulated because these departments cannot reallocate the costs.

Returning to the HR-MT reciprocated costs, MT attempts to assign these costs to each of the other entities involved in the analysis. However, MT cannot reallocate costs to HR, because HR has already allocated these costs. Similarly, MT cannot reallocate costs to MT, because MT has already received these costs. Thus, the costs can be allocated to IT, AS and TS. The IT department can reciprocate the costs to level 3. The costs allocated to AS and TS are accumulated because these departments cannot reallocate the costs.

At level 3, IT attempts to allocate costs to each of the other entities. However, these costs cannot be reallocated to any of the other support departments. As such, these cost are reallocated to the AS and TS departments and accumulated because these departments cannot reallocate the costs.

FIG. 12 is a table which graphically illustrates an example of one of the reciprocal costing systems and methods of this disclosure. With reference to the example of FIG. 12, the IT department can be analyzed. At the first level (as indicated by the column header), IT has a reciprocal relationship with itself, which is already included in the analysis based upon the direct costs of IT. Remaining at the first level, IT can also assign costs to an HR department, a MT department, an AS department and a TS department. The HR and MT departments are reciprocal entities, and therefore can reallocate the costs assigned to them from the IT department. As such, the cost is reciprocated to level 2 (as indicated by the column header). However, the AS and TS departments are not reciprocal entities. Therefore, the costs assigned to these entities from IT is accumulated because it is assigned to an end user.

At level 2, the HR department can try to reallocate the costs received from the IT department by inspecting all of the different departments to which it could reallocate costs. However, IT has already allocated these costs. Moreover, HR cannot allocate the costs to itself, because these costs have already been included in the analysis. The HR department can reallocate the costs to the MT departments because the MT department has not previously received costs via the IT-HR link. The costs assigned to MT are therefore reciprocated to level 3 (as indicated by the column header). HR can assign the costs to AS and TS. These costs are then accumulated because these costs cannot be reallocated from AS and TS.

At level 3, MT attempts to allocate costs to each of the other entities. However, these costs cannot be reallocated to any of the other support departments. As such, these cost are reallocated to the AS and TS departments and accumulated because these departments cannot reallocate the costs.

Returning to the IT-MT reciprocated costs, MT attempts to assign these costs to each of the other entities involved in the analysis. However, MT cannot reallocate costs to IT, because IT has already allocated these costs. Similarly, MT cannot reallocate costs to MT, because MT has already received these costs. Thus, the costs can be allocated to HR, AS and TS. The HR department can reciprocate the costs to level 3. The costs allocated to AS and TS are accumulated because these departments cannot reallocate the costs.

At level 3, HR attempts to allocate costs to each of the other entities. However, these costs cannot be reallocated to any of the other support departments. As such, these cost are reallocated to the AS and TS departments and accumulated because these departments cannot reallocate the costs.

FIG. 13 is a table which graphically illustrates an example of one of the reciprocal costing systems and methods of this disclosure. With reference to the example of FIG. 13, the MT department can be analyzed. At the first level (as indicated by the column header), MT has a reciprocal relationship with itself, which is already included in the analysis based upon the direct costs of MT. Remaining at the first level, MT can also assign costs to an IT department, an HR department, an AS department and a TS department. The IT and HR departments are reciprocal entities, and therefore can reallocate the costs assigned to them from the MT department. As such, the cost is reciprocated to level 2 (as indicated by the column header). However, the AS and TS departments are not reciprocal entities. Therefore, the costs assigned to these entities from MT is accumulated because it is assigned to an end user.

At level 2, the HR department can try to reallocate the costs received from the MT department by inspecting all of the different departments to which it could reallocate costs. However, MT has already allocated these costs. Moreover, HR cannot allocate the costs to itself, because these costs have already been included in the analysis. The HR department can reallocate the costs to the IT departments because the IT department has not previously received costs via the MT-HR link. The costs assigned to IT are therefore reciprocated to level 3 (as indicated by the column header). HR can assign the costs to AS and TS. These costs are then accumulated because these costs cannot be reallocated from AS and TS.

At level 3, HR attempts to allocate costs to each of the other entities. However, these costs cannot be reallocated to any of the other support departments. As such, these costs are reallocated to the AS and TS departments and accumulated because these departments cannot reallocate the costs.

Returning to the MT-IT reciprocated costs, IT attempts to assign these costs to each of the other entities involved in the analysis. However, IT cannot reallocate costs to MT, because MT has already allocated these costs. Similarly, IT cannot reallocate costs to IT, because IT has already received these costs. Thus, the costs can be allocated to HR, AS and TS. The HR department can reciprocate the costs to level 3. The costs allocated to AS and TS are accumulated because these departments cannot reallocate the costs.

At level 3, HR attempts to allocate costs to each of the other entities. However, these costs cannot be reallocated to any of the other support departments. As such, these cost are reallocated to the AS and TS departments and accumulated because these departments cannot reallocate the costs.

While examples have been used to disclose the invention, including the best mode, and also to enable any person skilled in the art to make and use the invention, the patentable scope of the invention is defined by claims, and may include other examples that occur to those skilled in the art. For example, those skilled in the art should understand that reciprocal costing systems and methods can be used in some instances to determine whether to outsource a department. For example, if the cost of keeping a department in-house is greater than the cost of contracting with an outside entity to perform the support service, a business could contract with the outside entity to save money and increase profits for stakeholders. Moreover, it should be understood that this analysis can be applied in a myriad of instances where one would like to know the true cost of an entity. Further, reciprocal costing systems and methods could be applied to analyze efficiencies within a company (e.g., comparing the entities associated with similar models to find overperforming or underperforming entities). Reciprocal costing systems could also be applied on the employee level to determine if duties could be reallocated to result in more efficiency, or to assist in business decisions regarding hiring and firing.

It is further noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable, media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

What is claimed is:

1. A computer-implemented method for use in analyzing costs associated with relationships among entities, comprising:

receiving on a processor, entity data corresponding to a plurality of entities, relationship data corresponding to direct and indirect reciprocal relationships between two or more entities, and activity-based cost data corresponding to direct and indirect costs distributable among the plurality of entities;

using the entity data, relationship data, and cost data to construct, on the processor, a model of a costing system;

using the model of the costing system to determine, on the processor, a cost allocation among the plurality of entities, wherein the cost allocation excludes double counting by avoiding reallocating costs to an entity that previously allocated or reallocated the costs; and wherein the allocation of costs is symmetrical among top level entities in the plurality of entities;

allocating on the processor, a direct cost among a plurality of entities, wherein at least one of the plurality of entities has a reciprocal relationship with another of the plurality of entities; and repeatedly reallocating on the processor, indirect costs of the entities that have reciprocal relationships until all indirect costs are reallocated to entities that have no reciprocal relationships with other entities, and wherein indirect costs are not reallocated to any entity that previously allocated or reallocated the indirect costs.

2. The method of claim 1, wherein at least two of the entities comprise service departments.

3. The method of claim 2, wherein at least one of the service departments comprises a human resources department, an information technology department, a maintenance department, or an administrative department.

4. The method of claim 2, further comprising determining whether to pay for a third party to provide a service department based upon the cost allocation.

5. The method of claim 1, wherein the reallocating of indirect costs occurs N-1 times, where N is a number of entities which have reciprocal relationships.

6. The method of claim 1, wherein the cost allocation does not change based upon the order in which the costs are allocated and reallocated to the entities.

7. The method of claim 1, wherein the allocation of costs provides an allocation of costs for each of the entities, thereby allowing a user to establish a cost associated with operating each of the entities.

8. The method of claim 1, wherein the step of reallocating an indirect cost comprises reallocating secondary costs from a first entity to a second entity;

wherein the first entity received an allocation of costs through a previous step of allocating or reallocating.

9. The method of claim 8, wherein the step of reallocation does not reallocate indirect costs from any entity that does not have a reciprocal relationship with another entity.

10. The method of claim 1, wherein the entities comprise at least one production department and more than one service department.

11. The method of claim 10, wherein the reallocating step reallocates an indirect cost of a first service department to a second service department and a production department without reallocating the cost to any service department that previously allocated or reallocated the cost.

12. The method of claim 1, wherein the entities comprise cost pools.

13. The method of claim 12, wherein cost pools include at least one of the group consisting of organizational cost pools, activity-based cost pools, or process-based cost pools, other logical groupings of money, and combinations thereof.

14. The method of claim 1, wherein allocating costs comprises at least one of budgeting, allocating expenses, allocating revenues, allocating profits, assigning capital, and combinations thereof.

15. The method of claim 1, wherein a reciprocal relationship comprises both direct reciprocal relationships and indirect reciprocal relationships.

16. A system for use in analyzing costs associated with relationships among entities, comprising:
   a processor;
   a computer-readable storage medium containing instructions operable to cause the processor to perform operations including:
   receiving entity data corresponding to a plurality of entities, relationship data corresponding to direct and indirect reciprocal relationships between two or more entities, and activity-based cost data corresponding to direct and indirect costs distributable among the plurality of entities;
   using the entity data, relationship data, and cost data to construct a model of a costing system;
   using the model of the costing system to determine a cost allocation among the plurality of entities, wherein the cost allocation excludes double counting by avoiding reallocating costs to an entity that previously allocated or reallocated the costs; and wherein the allocation of costs is symmetrical among top level entities in the plurality of entities;
   allocating a direct cost among a plurality of entities, wherein at least one of the plurality of entities has a reciprocal relationship with another of the plurality of entities; and
   repeatedly reallocating indirect costs of the entities that have reciprocal relationships until all indirect costs are reallocated to entities that have no reciprocal relationships with other entities, and wherein indirect costs are not reallocated to any entity that previously allocated or reallocated the indirect costs.

17. The system of claim 16, wherein at least two of the entities comprise service departments.

18. The system of claim 17, wherein at least one of the service departments comprises a human resources department, an information technology department, a maintenance department, or an administrative department.

19. The system of claim 16, further comprising instructions operable to cause the processor to perform operations including:
   providing a cost allocation for each of the entities, thereby allowing a user to establish a cost associated with operating each of the entities.

20. The system of claim 16, further comprising instructions operable to cause the processor to perform operations including:
   determining when an operating cost associated with operating an entity is greater than an outsourcing cost associated with outsourcing the entity, and
   outsourcing the entity based upon the determination.

21. The system of claim 16, wherein the allocating and reallocating of indirect costs occurs N-1 times, where N is a number of entities which have reciprocal relationships.

22. The system of claim 16, wherein the cost allocation does not change based upon the order in which the costs are allocated and reallocated to the entities.

23. The system of claim 16, wherein reallocating an indirect cost comprises reallocating secondary costs from a first entity to a second entity;
   wherein the first entity has an allocation of costs through a previous allocation or reallocation.

24. The system of claim 23, wherein indirect costs are not reallocated from any entity that does not have a reciprocal relationship with another entity.

25. The system of claim 16, wherein the entities comprise at least one production department and more than one service department.

26. The system of claim 25, wherein reallocating includes reallocating an indirect cost of a first service department to a second service department and a production department without reallocating the cost to any service department that previously allocated or reallocated the cost.

27. The method of claim 16, wherein the entities comprise cost pools.

28. The system of claim 27, wherein cost pools include at least one of the group consisting of organizational cost pools, activity-based cost pools, or process-based cost pools, other logical groupings of money, and combinations thereof.

29. The system of claim 16, wherein allocation of costs comprises at least one of budgeting, allocation of expenses, allocation revenues, allocation of profits, allocation of capital, or combinations thereof.

30. The system of claim 16, wherein a reciprocal relationship comprises both direct reciprocal relationships and indirect reciprocal relationships.

31. Computer software stored on one or more computer readable mediums, the computer software comprising program code for carrying out a method for use in analyzing costs associated with relationships among entities, the method comprising:
   receiving on a processor, entity data corresponding to a plurality of entities, relationship data corresponding to direct and indirect reciprocal relationships between two or more entities, and activity-based cost data corresponding to direct and indirect costs distributable among the plurality of entities;
   using the entity data, relationship data, and cost data to construct, on the processor, a model of a costing system;
   using the model of the costing system to determine, on the processor, a cost allocation among the plurality of entities, wherein the cost allocation excludes double counting by avoiding reallocating costs to an entity that previously allocated or reallocated the costs; and wherein the allocation of costs is symmetrical among top level entities in the plurality of entities;

allocating on the processor, a direct cost among a plurality of entities, wherein at least one of the plurality of entities has a reciprocal relationship with another of the plurality of entities; and repeatedly reallocating on the processor, indirect costs of the entities that have reciprocal relationships until all indirect costs are reallocated to entities that have no reciprocal relationships with other entities, and wherein indirect costs are not reallocated to any entity that previously allocated or reallocated the indirect costs.

* * * * *